(No Model.)
W. S. FRAZIER.
SULKY.
No. 253,275. Patented Feb. 7, 1882.
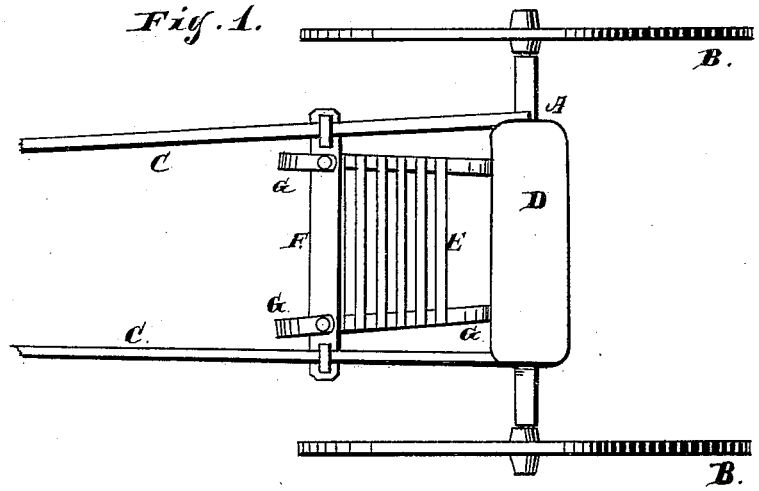
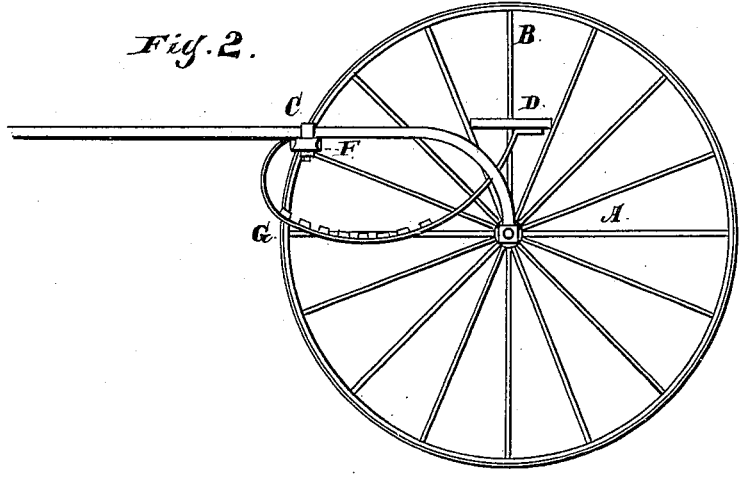
Witnesses:
Albert H. Adams.
Edgar T. Bond
Inventor
Walter S. Frazier.
By West & Bond.
His Attys.

UNITED STATES PATENT OFFICE.

WALTER S. FRAZIER, OF AURORA, ILLINOIS.

SULKY.

SPECIFICATION forming part of Letters Patent No. 253,275, dated February 7, 1882.

Application filed July 2, 1881. (No model.)

*To all whom it may concern:*

Be it known that I, WALTER S. FRAZIER, residing at Aurora, in the county of Kane and State of Illinois, and a citizen of the United States, have invented a new and useful Improvement in Sulkies, of which the following is a full description, reference being had to the accompanying drawings, in which—

Figure 1 is a top or plan view; Fig. 2, a side elevation with the wheel B' removed.

The object of this invention is to improve the construction and operation of sulkies or two-wheeled vehicles by connecting the seat to a spring foot-rest support so arranged that the seat and curved foot-rest will be supported by the same spring-bars; and its nature consists in combining the curved spring-bars with the foot-rest and seat, so as to support both upon spring-bars supported from or by the thills or shafts, and give the seat the proper elevation above the foot-rest.

In the drawings, A indicates the axle; B B', the wheels; C, the shafts; D, the seat; E, the foot-rest; F, the cross-bar of the shafts, and G the spring seat and foot-rest supporting-bars.

The axle and wheels A B B' may be made in any of the usual or well-known forms. The shafts are also made of the usual form of shafts, extending back to and connected with the axle. The shafts are connected to the axle by clips or by other well-known means. The spring-bars G, in the form shown, are attached to the cross-bar. The front ends of the springs are curved downward at the proper curve to give the foot-rest the desired position, and the rear ends are extended upward and backward, so as to give the seat the desired position or elevation. These spring-bars, when made in their best form, are made of yielding material their entire length, except where connected with the seat; but it is evident that the spring portion may be entirely between the foot-rest and the front support, and that the rear portions may be made of other material, and that the front may be rigid and the rear part elastic.

By this construction I am able to keep the seat down in a low position and give the foot-rest a proper location for convenience and ease, and by avoiding the use of separate seat-rails the seat is easily mounted at its side from behind without climbing over seat-rails, and by this arrangement of supporting the seat and foot-rest at different elevations on the same bars, I produce a neat, compact, and efficient cheap sulky.

I have shown the foot-rest E as composed of slats; but it is evident that these slats may be brought nearly or quite together, so as to form a compact and practically continuous bottom, and that narrow side boards or braces may be placed at each end of the foot-rest, especially when the springing part of the arms or supports G is limited to their front ends.

What I claim as new, and desire to secure by Letters Patent, is—

1. The curved spring-bars G, in combination with the seat D, foot-rest E, and the cross-bar or shafts, substantially as specified.

2. In a sulky or two-wheeled vehicle, the spring arms or bars G, curved to support the foot-rest and seat in their proper relative positions, substantially as described.

WALTER S. FRAZIER.

Witnesses:
B. A. PRICE,
ALBERT H. ADAMS.